Patented Jan. 5, 1943

2,307,684

UNITED STATES PATENT OFFICE 2,307,684

LIQUEFICATION OF STARCH

Hans O. Kauffmann, Eggertsville, Paul H. Margulies, Kenmore, and Joseph R. Ryan, Buffalo, N. Y., assignors to Buffalo Electro-Chemical Company, Inc., Buffalo, N. Y.

No Drawing. Application July 12, 1940, Serial No. 345,236

9 Claims. (Cl. 127—33)

This invention relates to a method of liquefying starch by treating natural or raw starch with a peroxide in the presence of a catalyst aiding in the liquefying action of the peroxide on the starch.

For many uses of starch it has been found necessary heretofore to change raw starch into the so-called liquid condition in order to obtain the best results in practical use. These treatments, generally known as liquefication treatments, differed very considerably from the usual type of hydrolysis under acid conditions to produce sugars and also from the degradation occurring under highly alkaline conditions producing dextrins. Heretofore it has been proposed to liquefy starch by subjecting the same to the action of an enzyme, such as diastase. This action had to be effected under closely controlled conditions of concentration of enzyme, temperature variation, hydrogen ion concentration, and time of treatment to prevent too great a degradation of the starch since it is desired to produce only liquefied starch and not lower degradation products.

It has furthermore been proposed to liquefy starch by the use of a persulfate or hydrogen peroxide. Although it is well known that hydrogen peroxide induces liquefication, rather large amounts of peroxide were required to produce this effect and furthermore the quantity of degradation products of starch was large so that liquefication with peroxide was neither economical nor practical.

It is our belief that the following difference in degradation products of starch exists between the use of hydrogen peroxide, as heretofore known, persulfate, and enzymes. As previous art indicates, hydrogen peroxide must be used in relatively large quantities to accomplish liquefication. This results in the production of too great a concentration of sugars and aldehydes as end products of the reaction. Persulfate produces relatively small quantities of these degradation products and for that reason has been preferred as a liquefier, although it has the commercial disadvantage of producing a liquefied product which jells on cooling. Enzymatic liquefication is unpredictable due to the difference in activity of each batch of enzymes and for that reason it is impossible to predetermine the concentration of aldehydes or sugars that will be obtained in each instance. However, it is well known that enzymes will produce relatively large concentrations of these substances.

When peroxide is used to liquefy the starch in the presence of a substance catalyzing or inducing the liquefication reaction of peroxide on starch, as is shown below, relatively small quantities of peroxide are effective in producing the desired liquefication of the starch. This serves two useful purposes, namely, a decrease in cost of operation and a decrease in the quantity of degradation products, namely, sugars and aldehydes.

The present invention permits of the employment of peroxide in the liquefication of starch in amounts much smaller than heretofore thought possible.

The present invention also provides a method for liquefying starch in which the course of the liquefying action is readily controlled and in which the end product is contaminated with a minimum of lower degradation products.

The invention provides a method where liquefied starch of reproducibly desired properties can be made by a chemical action as contrasted with difficultly controllable biologic action in the case of enzymes.

The invention also provides a method for liquefying starch by the use of a small quantity of a peroxide in the presence of a minute amount of a catalyst aiding in the liquefying action of the peroxide upon starch. As the method is reproducible it provides a means of economically manufacturing liquefied starch solutions of controlled and predetermined viscosity.

In accordance with the procedures of the present invention, raw starch of suitable origin is treated at elevated temperatures with a peroxide in the presence of a catalyst increasing the effectiveness of peroxide as a liquefying material. Thorough mixing of starch and liquefying agent, however, may be accomplished at room temperature since there is substantially no reaction between the starch and the peroxide employed as liquefying agent. In contrast with this reaction liquefication by enzymes occurs at lower temperatures and therefore non-homogeneous liquefication may occur even before the bulk of the starch is well mixed with the enzyme in aqueous dispersion.

The liquefication treatment is preferably performed in aqueous solution at the desired concentration of starch even up to 50% or more of starch and in general in such manner that the liquefied starch finally obtained possesses a pH of between about pH 6 and pH 8, slightly more or less, that is to say, in the neighborhood of the neutral point. The aqueous dispersion of starch to be liquefied contains, in addition to the peroxide, a catalyst aiding the liquefying action of the peroxide upon starch. It has been found that copper salts and metallic copper in contact with the slurry or dispersion of starch possess the specific property of increasing the solubilizing action of the peroxide upon starch. This action is contrasted with the specific decomposition of peroxide effected by copper in effective amounts.

As a specific example 50 grams of tapioca starch were mixed with 500 ml. of distilled water to prepare approximately a 10% solution of starch, and 0.15% of hydrogen peroxide, namely, 0.25 ml. of hydrogen peroxide 100 volume, was added to the solution. In order to obtain a final end pH of between 6 and 8, 0.4%, that is 0.2 gram, sodium carbonate was initially added to the water used in making the starch dispersion. After agitation to obtain thorough mixing, the batch was heated at 90° C., that is, a temperature above the gel point of starch which is known to be in the neighborhood of 60° C., for 30 minutes at which time liquefication was complete. After the starch had been liquefied in the above manner, the fluidity of the starch was determined by permitting the solution to discharge from a standard viscosimeter tube and the time of discharge in seconds measured as the fluidity. The above liquefication was carried out in glass vessels. The fluidity or discharge time in seconds was found to be 250 at an end pH of 7.7.

Another batch containing the same amounts of materials was made up and in addition there was added 0.0005 gram $CuSO_4 5H_2O$ as a catalyst aiding the liquefying action of the peroxide upon the starch and manipulation carried out as before, namely, after uniform stirring, to heat the mixture in glass at 90° C. for 30 minutes. The fluidity, that is, discharge time of the starch, was found to be 100 seconds.

To determine the effect of metallic copper as a catalyst in aiding the solubilizing action of search, the mixture was placed in contact with copper by suspending copper strips therein and the liquefication carried out in glass as before. The fluidity of the resultant material was found to be 105 seconds at an end pH of 6.7. When the copper strips were replaced by a copper stirring rod and another similar mixture stirred therewith, the fluidity at an end pH of 7.4 was found to be 90 seconds.

It is well known that copper and copper salts may act as decomposition catalysts upon hydrogen peroxide and an experiment was performed with the same concentration of starch and alkali as mentioned above but employing 1 gram copper sulfate. The final product possessed an end pH of 9.8 and was not fluid or liquefied, the copper sulfate presumably decomposing the hydrogen peroxide too rapidly into water and oxygen so that the peroxide exerted no solubilizing action upon the starch.

It has been found that manganese or manganese salts function as effective catalysts for the peroxide-starch solubilizing action. Thus, a 10% solution of starch containing 0.4% sodium carbonate was liquefied in glass, as previously described, in the presence of 0.5 milligram of manganese chloride and a liquefied starch obtained possessing a fluidity of 90 seconds. As in the case of copper, excessive quantities of the manganese salt acted to accelerate decomposition of peroxide rather than to catalyze the solubilizing action of the peroxide on the starch as it was found that the addition of 50 milligrams of manganese chloride to the standard mix used in the examples above did not produce a solubilized or fluid starch solution.

The function of the sodium carbonate is to regulate the final or end pH of the liquefied starch, and under some circumstances alkalies other than sodium carbonate may be employed. It is suggested that an initial pH of above 7, preferably about 9 to 10, be produced in the mixture or slurry of raw starch in order that any acidic materials produced in the course of the liquefication action may be neutralized.

Although hydrogen peroxide has been illustrated as the preferred solubilizing agent, it will be understood that other peroxides may be substituted therefor, as, for instance, the alkali metal peroxides, the percarbonates, persilicates, etc. When such alkaline peroxides are substituted, the quantity of alkali is reduced in amount or replaced by sufficient acid to produce an initial pH of about 9–10.

The terms "copper" and "manganese," as used in the claims herein, include the appropriate metal and salts thereof.

What is claimed is:

1. The method of making a starch solution of the liquefied type which comprises treating the starch at a temperature above the gel point thereof with a peroxide in the presence of sufficient copper to catalyze the liquefying action of the peroxide on the starch, the copper being employed in an amount insufficient to effect rapid decomposition of the peroxide.

2. The method of making a starch solution of the liquefied type which comprises treating the starch at a temperature above the gel point thereof with a peroxide in the presence of sufficient copper salt to catalyze the liquefying action of the peroxide on the starch, the copper salt being employed in an amount insufficient to effect rapid decomposition of the peroxide.

3. The method of making a starch solution of the liquefied type which comprises treating the starch at a temperature in the neighborhood of 90° C. with a peroxide in the presence of sufficient copper to catalyze the liquefying action of the peroxide on the starch, the copper being employed in an amount insufficient to effect rapid decomposition of the peroxide.

4. The method of making a starch solution of the liquefied type which comprises treating the starch at a temperature in the neighborhood of 90° C. with a peroxide in the presence of copper sufficient in amount to catalyze the liquefying action of the peroxide on the starch but insufficient in amount to effect rapid decomposition of the peroxide, and an amount of alkali to produce an end product having a pH of between about 6 to 8.

5. The method of making a starch solution of the liquefied type which comprises treating the starch at a temperature above the gel point thereof with a peroxide in the presence of sufficient manganese to catalyze the liquefying action of the peroxide on the starch, the manganese being employed in an amount insufficient to effect rapid decomposition of the peroxide.

6. The method of making a starch solution of the liquefied type which comprises treating the starch at a temperature above the gel point thereof with a peroxide in the presence of sufficient manganese salt to catalyze the liquefying action of the peroxide on the starch, the manganese salt being employed in an amount insufficient to effect rapid decomposition of the peroxide.

7. The method of making a starch solution of the liquefied type which comprises treating the starch at a temperature in the neighborhood of 90° C. with a peroxide in the presence of sufficient manganese to catalyze the liquefying action of the peroxide on the starch, the manganese being employed in an amount insufficient to effect rapid decomposition of the peroxide.

8. The method of making a starch solution of the liquefied type which comprises treating the starch at a temperature in the neighborhood of 90° C. with a peroxide in the presence of manganese sufficient in amount to catalyze the liquefying action of the peroxide on the starch but insufficient in amount to effect rapid decomposition of the peroxide, and an amount of alkali to produce an end product having a pH of between about 6 to 8.

9. The method of making a starch solution of the liquefied type which comprises treating the starch at a temperature above the gel point thereof with a peroxide and a substance catalyzing the liquefying action of the peroxide on the starch selected from the group consisting of copper and manganese, said substance being employed in an amount sufficient to catalyze the liquefying action of the peroxide on the starch but insufficient in amount to effect rapid decomposition of the peroxide.

HANS O. KAUFFMANN.
PAUL H. MARGULIES.
JOSEPH R. RYAN.